United States Patent [19]

Hise

[11] Patent Number: 5,009,763

[45] Date of Patent: Apr. 23, 1991

[54] HONEYCOMB SOLID OXIDE ELECTROLYTIC CELL ASSEMBLY AND METHOD

[75] Inventor: Ralph E. Hise, Shaker Heights, Ohio

[73] Assignee: Advanced Technologies Management, Inc., Shaker Heights, Ohio

[21] Appl. No.: 341,869

[22] Filed: Apr. 24, 1989

[51] Int. Cl.$^5$ .................... C25B 9/00; C25B 15/08; C25B 11/03; C25B 11/04

[52] U.S. Cl. .................... 204/255; 204/257; 204/260; 204/268; 204/269; 204/284; 429/13; 429/30; 429/31

[58] Field of Search ............... 204/268-270, 204/284, 283, 260, 253-258; 429/13, 30, 31

[56] References Cited

U.S. PATENT DOCUMENTS

| | | | |
|---|---|---|---|
| 4,174,260 | 11/1979 | Schmidberger | 204/260 |
| 4,666,798 | 5/1987 | Herceg | 429/30 X |
| 4,728,584 | 3/1988 | Isenberg | 204/260 X |
| 4,833,045 | 5/1989 | Pollack et al. | 429/30 |
| 4,876,163 | 10/1989 | Reichner | 429/30 |

*Primary Examiner*—Donald R. Valentine
*Attorney, Agent, or Firm*—Pearne, Gordon, McCoy & Granger

[57] ABSTRACT

A apparatus and method for the reduction and oxidation of constituents of a fluid is disclosed. The apparatus comprises a honeycomb-like structure of oxygen ion conducting ceramic having at least one passage. The passage is lined with a porous bipolar electrode and porous electrodes are formed outside the passage on the ceramic structure, the electrode in the passage being between the outside electrodes. If a voltage is applied to the outside electrodes, reducible and oxidizable constituents in a fluid passing over the passage electrode are oxidized and reduced. The capacity of the apparatus may be increased by increasing the number of passages/electrodes located between the outside electrodes.

20 Claims, 2 Drawing Sheets

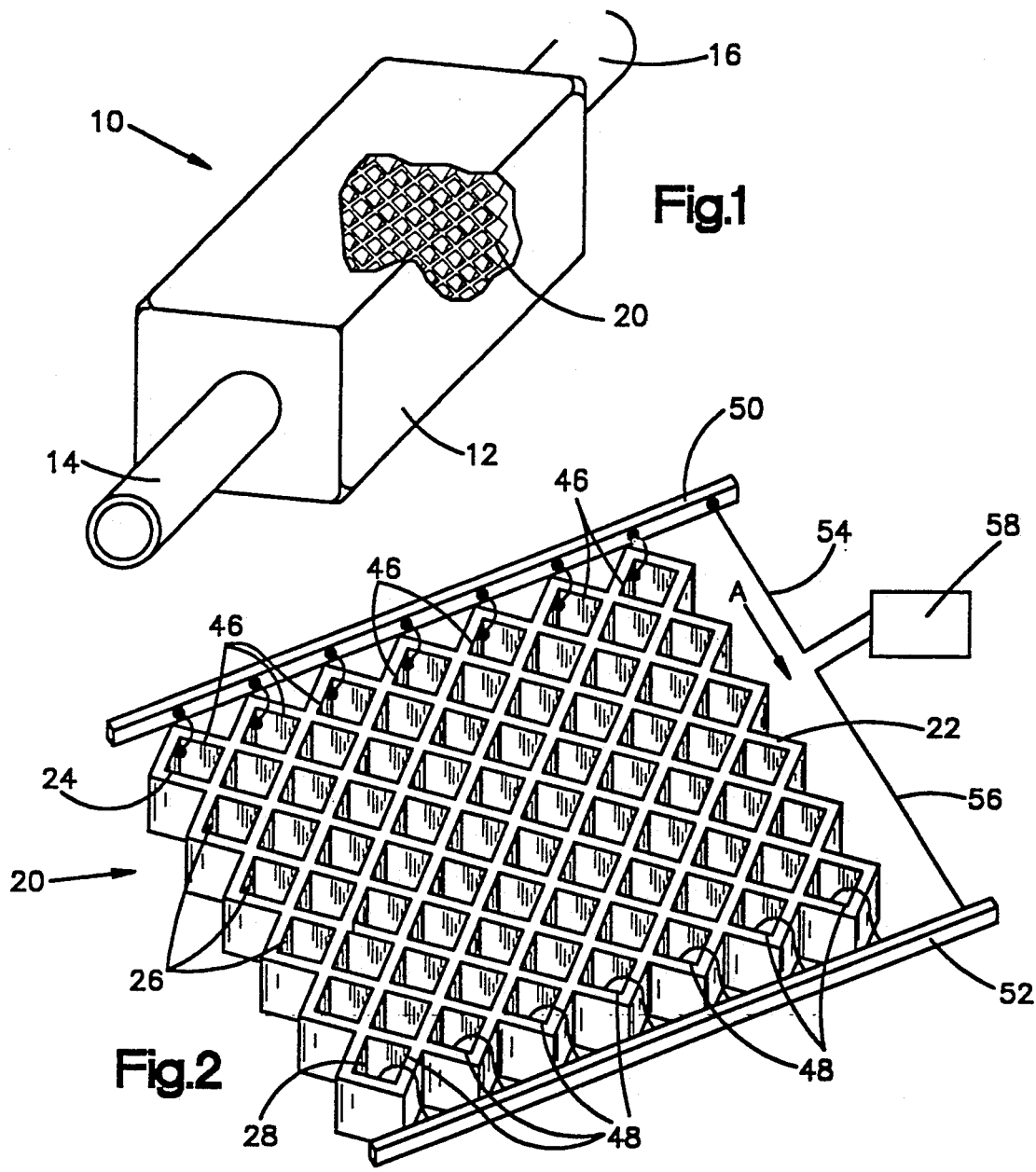
Fig.1
Fig.2
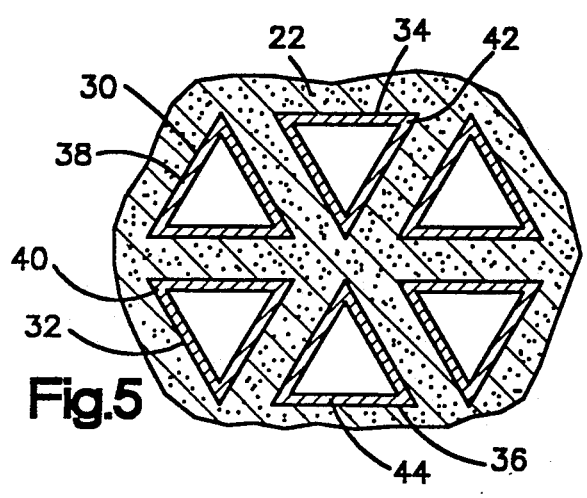
Fig.5
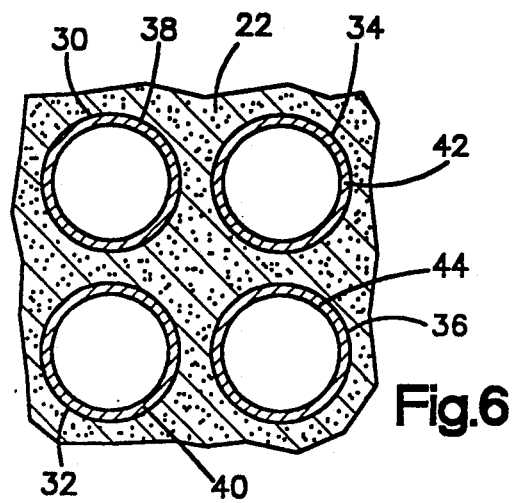
Fig.6

HONEYCOMB SOLID OXIDE ELECTROLYTIC CELL ASSEMBLY AND METHOD

BACKGROUND OF THE INVENTION

The present invention relates to an apparatus and method for the reduction and oxidation of constituents of a fluid. The invention is particularly applicable to the removal of pollutants from gases.

Removal of nitrogen oxide(s), sulfur dioxide, hydrocarbons and carbon monoxide from motor vehicle exhaust gases and from other fluid streams in various industrial processes presents a significant challenge.

It is critical that the level of these compounds in the environment be minimized. Yet, the processes generating these compounds are vital to the world's economy and the well-being of its people.

As a result, many different means have been employed to minimize these compounds in fluid streams. These involve both means to minimize the production of the compounds and means to remove the compounds after their production.

Most of these means add significantly to the cost and/or complexity of the underlying process. As a result, significant time, effort and resources have been expended to discover better means to minimize the amounts of these compounds released into the environment.

U.S. Pat. No. 4,253,925 to Mason sets forth an apparatus or cell for the reduction of nitrogen oxide(s) and carbon monoxide in an exhaust gas. An oxygen ion conducting ceramic electrolyte is provided with porous electrodes on opposite sides. Air flows by one electrode and exhaust gas flows by the other electrode. An electrical potential is applied between the electrodes, the exhaust gas electrode being negative with respect to the air electrode. Nitrogen oxide(s) and carbon monoxide in the exhaust gas are reduced to nitrogen and carbon, the oxygen picking up electrons from the negative electrode, negative oxygen ions passing through the ceramic and giving up electrons to the positive electrode, and oxygen passing into the air. The design requires communication with air separate from the exhaust gas. The capacity of the apparatus may be increased by increasing length of the cell or operating several independent cells in parallel (in the sense of gas flow) with each electrode electrically connected by a conductor to the respective electrode of another cell either in electrical parallel or series.

Commercial application typically places constraints on the permissible length of a cell and the use of parallel cells as, illustrated in Mason, substantially increases the complexity of the device.

Mason also shows an embodiment wherein the gases flow along a linear series of the cells, wherein only the opposite electrode of each end cell is connected by a conductor to the electrical potential. The alternating adjacent opposite electrodes of the other cells are then interconnected by conducting members between each cell. In this embodiment communication with air separate from the exhaust gas is still required.

Mason's second embodiment is difficult to construct, because it requires substantial fabrication and attention to sealing.

U.S. Pat. No. 4,659,448 to Gordon disclose a single cell similar to Mason's except that both electrodes are exposed to exhaust gas, rather than one to air. This allows not only the reduction of nitrogen oxide(s) and sulfur dioxide at the negative electrode, but also oxidation of carbon monoxide and hydrocarbons at the positive electrode.

As in Mason's apparatus, the capacity of Gordon's device can not be readily increased. Either the length can be increased or discrete cells can be operated in parallel with all the attendant complexity.

SUMMARY OF THE INVENTION

The present invention offers a simple, efficient and low cost apparatus and method for the reduction and oxidation of constituents of a fluid.

The apparatus comprises an ion conducting ceramic structure, a passage extending through the structure, a first porous electrode at least partially lining the passage, and a second and a third porous electrode on the structure external to the passage.

The second and third electrodes are juxtaposed about the first electrode. Also, the second and third electrodes are adapted to be connected to respective terminals of a voltage supply. The first electrode is connected to the external voltage supply by only ion flow through the ceramic and is otherwise free of electrical connection to the external voltage supply.

When a gas having oxidizable and reducible constituents is passed through the passage and an electrical potential applied between the second and third electrodes, both reduction and oxidation reactions occur about the first electrode.

The capacity of the invention may be increased by adding additional passages through the ceramic structure. Each of these passages also has a porous electrode at least partially lining the passage. All of the additional electrodes are also located between the second and third electrodes, possibly in several courses. Both reduction and oxidation reactions then occur about all the porous electrodes juxtaposed between the second and third porous electrodes.

Passages of various cross section may be employed, but passages in the form of rows of square diamonds with respect to the applied electrical potential make full use of the available porous electrode area, as well as offering good structural strength.

In one embodiment, the invention can comprise a honeycomb-like ceramic structure within an enclosure having an inlet for fluid at the entrance of the honeycomb passages and an outlet at the exit of the passages.

BRIEF DESCRIPTION OF THE DRAWINGS

FIG. 1 is a perspective view, partially cut away, of an embodiment of a ceramic apparatus of the invention and an enclosure.

FIG. 2 is a perspective view, on an enlarged scale, of the ceramic apparatus of FIG. 1.

FIG. 5 is a cross sectional view of another additional embodiment of the invention.

FIG. 6 is a cross sectional view of still another additional embodiment of the invention.

DESCRIPTION OF THE PREFERRED EMBODIMENTS

Figure 3:
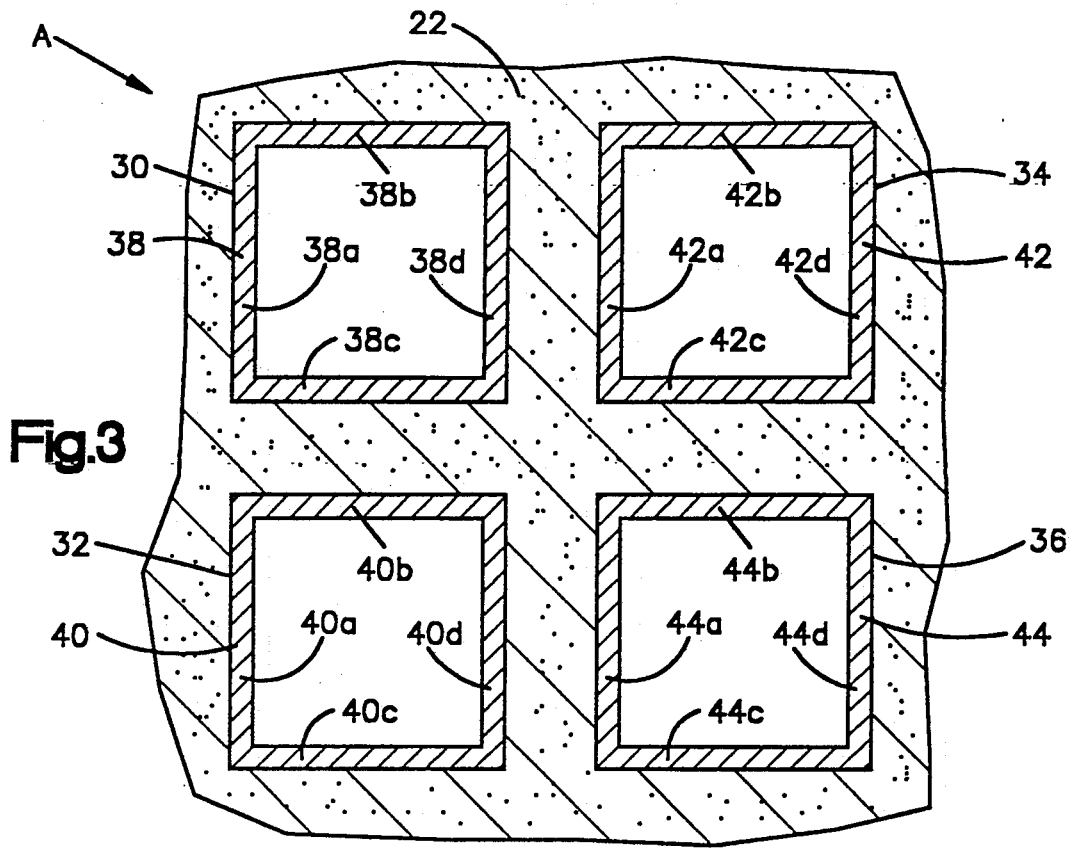
FIG. 3 is a partial cross sectional view about a central portion of the ceramic apparatus of FIG. 2, normal to the axis of the passages.

The present invention offers a simple, efficient and low cost means for the reduction and oxidation of constituents of a fluid. For illustration, the invention is described in terms of its operation upon fluids containing one or more of the following compounds: nitrogen oxide(s), sulfur dioxide, hydrocarbons and carbon monoxide. This is for illustration only, as the invention has application to the reduction and/or oxidation of other constituents to be separated from a fluid stream.

Referring to FIG. 1, a device 10 is shown for in-line treatment of a fluid stream in accordance with the invention. Device 10 includes a fluid-tight enclosure 12, having an inlet 14 and an outlet 16. A ceramic apparatus 20 is mounted within enclosure 12 for contact with the fluid stream to effect reduction or oxidation of constituents in the stream a described below.

Referring to FIG. 2, the apparatus 20 comprises a honeycomb-like ceramic electrolyte structure 22 having rows of square passages 24, 26, 28 extending through structure 22. The square passages are oriented diagonally to the rows 24, 26, 28.

Structure 22 is formed of a non-porous oxygen ion conducting ceramic. Such material may for example be yttria stabilized zirconia. The structure may, for example, be cast, machined or preferably extruded.

Numerous solid metal oxides may be employed in the practice of this invention. Suitable oxides include, but are not limited to, zirconia ($ZrO_2$), hafnia (HfO), titania ($TiO_2$), lanthanides such as ceria ($CeO_2$), samaria ($Sm_2O_3$), yttria ($Y_2O_3$), erbia ($Er_2O_3$), scandia ($ScO_2$), perovskites, pyrochlores, calcia ($CaO_2$), magnesia (MgO), gadolinia ($Gd_2O_3$), bismuth oxide ($Bi_2O_3$) and the like, or a combination of one or more of the above oxides. One or more metal salts may be included in the ceramic electrolyte. Useful salts are the oxides, silicates, fluorides, carbides, borides or nitrides of metals wherein the oxidation state of the metal is one or greater but not greater than seven. Illustrative salts include, but are not limited to titanium diboride ($TiB_2$), molybdenum disilicide ($MoSi_2$), chromium carbide (CrC), zirconium carbide (ZrC), silicon carbide (SiC), magnesia (MgO), lanthium oxide ($LnO_x$), and yttria ($Y_2O_3$).

Referring to FIG. 3, representative passages 30, 32, 34, 36 of rows 26 are shown in cross section. Direction A of FIG. 3 corresponds to direction A of FIG. 2. The wall of each passage 30, 32, 34, 36 is lined with a porous bipolar electrode 38, 40, 42, 44, respectively. The electrodes may, for example, be formed of silver, cobalt, nickel, copper, iron, or platinum or a combination thereof. The electrodes may for example be plated or vapor deposited onto the inner surfaces of the passages. The pores of the electrodes are ideally as closely spaced as possible given the constraint that they must be at least large enough to admit the molecules involved in the reactions of the invention.

Similarly, each passage of rows 24, 28 may also be advantageously provided with porous electrodes 46, 48, respectively.

Electrodes 46, 48 are electrically connected to bus bars 50, 52, respectively. The connections may, for example, be made by bonding wires therebetween. Bus bars 50, 52 are also connected by wires 54, 56, respectively, to voltage source 58. Voltage source 58 may be either direct current of either polarity or alternating current, but for ease of explanation, operation of the invention will be described for bus bar 50 being at a negative electrical potential with respect to bus bar 52. The voltage of supply 58 is chosen to provide the voltage necessary to electrochemically induce the desired reactions in the fluid to be treated. It may, for example, be roughly equal in volts to the number of rows 24, 26, 28 in apparatus 20. A potential difference of about 1 volt then occurs between rows.

In accordance with the invention, the electrodes are disposed in a stream of the fluid for reduction and/or oxidation of one or more constituents in the fluid. If the fluid includes nitrogen oxide(s), hydrocarbons and sulfur compounds as constituents in exhaust gases from motor vehicles or flue gases from combustion processes, reduction reactions which may occur at cathodic regions of an electrode include the following:

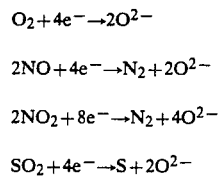

$$O_2 + 4e^- \rightarrow 2O^{2-}$$

$$2NO + 4e^- \rightarrow N_2 + 2O^{2-}$$

$$2NO_2 + 8e^- \rightarrow N_2 + 4O^{2-}$$

$$SO_2 + 4e^- \rightarrow S + 2O^{2-}$$

Oxide ions produced in the reduction reactions flow to anodic regions of adjacent electrodes where the following oxidation reactions may occur:

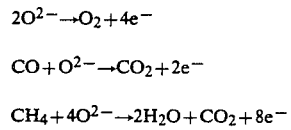

$$2O^{2-} \rightarrow O_2 + 4e^-$$

$$CO + O^{2-} \rightarrow CO_2 + 2e^-$$

$$CH_4 + 4O^{2-} \rightarrow 2H_2O + CO_2 + 8e^-$$

As indicated above, the occurence of the foregoing reactions will depend upon the respective reduction and oxidation potentials of the reactions and the potential difference between rows or adjacent electrode regions.

The fluid in the passages of rows 24 and 28 which are electrically connected to external voltage supply 58 via electrodes 46 and 48 are limited to reduction or oxidation reactions depending upon the polarity of the electrode. In contrast with electrodes 46 and 48, the electrodes of rows 26 are free of external electrical connections and their electrical potential is due to oxide ion flow through the ceramic electrolyte structure 22.

The electrodes of rows 26, such as electrodes 38, 40, 42, and 44, each include cathodic and anodic regions. Accordingly, constituents in fluid flowing through passages e.g. 30, 32, 34, 36 of rows 26 may be reduced or oxidized. Assuming electrodes 46 to have a negative polarity, an anodic region is provided along the walls 38a and 38b of the electrode 38 and a cathodic region is provided along the walls 38c and 38d. Similarly oriented regions are provided in the electrodes 40, 42 and 44 as shown in FIG. 3.

An important aspect of the invention is the ease with which various fluid capacities may be achieved. Capacity may be increased or decreased merely by adjusting the number of passages in each row 24, 26, 28 and/or the number of rows 26. No complicated electrical interconnections are required, no complicated means for mounting multiple structures is necessitated and the basic number of parts stays the same.

From the above, it should be apparent that reduction and oxidation reactions only occur at electrodes of differing potentials on opposite sides of ceramic electrolyte walls. Because of this, it would of course be possible to eliminate the passages of rows 24, 28, leaving only the portions of electrodes 46, 48 on what would then be the outside walls of structure 22. In the resulting configuration, electrodes 46, 48 could as well each be single continuous electrodes. However, retaining rows 24, 28 has the advantage that the outer periphery of structure 22 is largely electrically insulated from the electrically active interior, making the physical mounting of structure 22 within an enclosure simpler.

Figure 4:
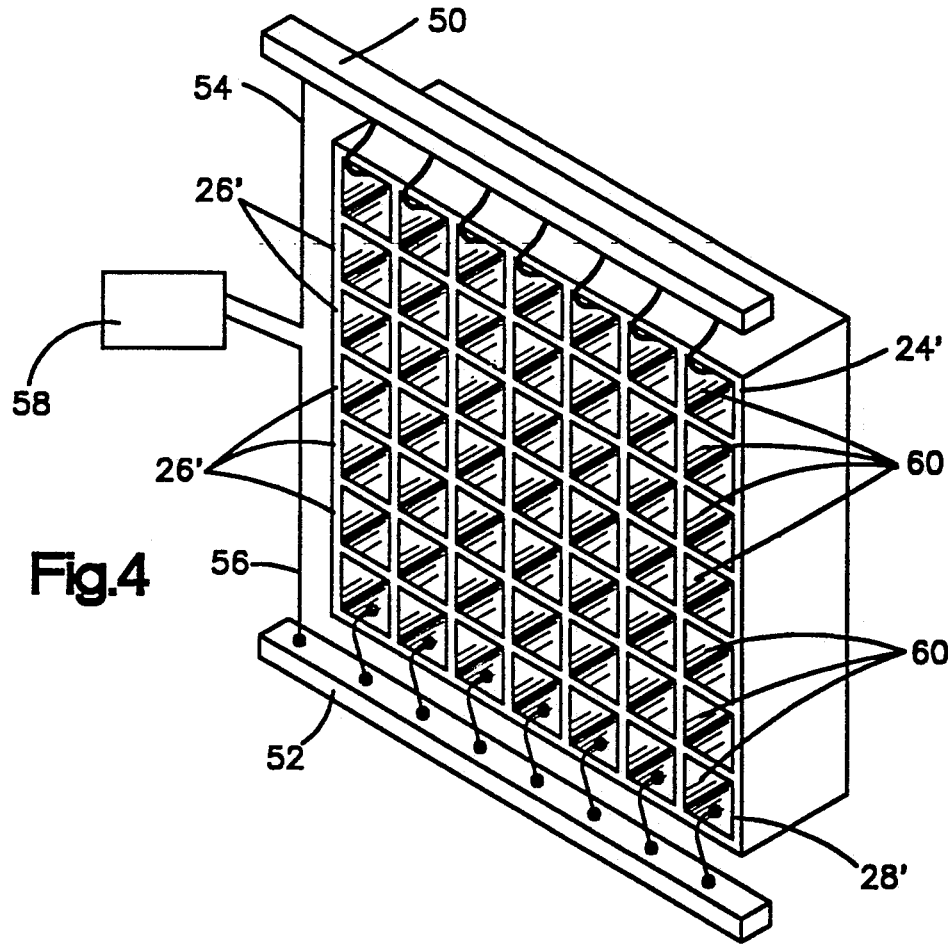
FIG. 4 is a perspective view of an additional embodiment of the invention.

Referring to FIG. 4, another embodiment of the invention is shown. In this embodiment, the square passages are parallel rather than diagonal to rows of passages 24', 26', 28'. As before, each passage is provided with a porous electrode.

From the above discussion, it should be apparent that, in this embodiment, the portion of the electrodes on vertical walls 60 induce no reactions, as there is no potential difference between electrodes on opposite sides of the vertical walls. This portion of the electrode only serves as a connection to the top and bottom portions, as well as for structural spacing. For this reason, some of the vertical walls could be eliminated.

The embodiment of FIG. 2 has the advantage that "dead" areas of the electrodes are not present, as they are in the embodiment of FIG. 4. In this manner, the diamond-shaped cross section of the passages of embodiment of FIG. 2 optimizes the electrode area. It should be understood that the diamond-shaped cross section is not limited to a square configuration, but includes polygons having four sides and the electrical potential applied across opposed vertices.

Many configurations are possible for the cross section of the passages in structure 22. FIGS. 5 and 6 illustrate the use of a triangular cross section and a circular cross section. It is preferable to make the walls surrounding the passages as thin and of as uniform thickness as possible, consistent with the required structural strength.

Referring once again to FIG. 1, the apparatus 20 is mounted inside enclosure 12 so that fluid entering inlet 14 flows through the passages e.g. 30, 32, 34, and 36 of apparatus 20 and out outlet 16. The oxidizable and reducible constituents in the fluid are respectively oxidized and reduced by reaction at appropriate anodic and cathodic electrode regions in accordance with the energization of the apparatus.

The device of FIG. 1 could be used, for example, as a pollution control device for an internal combustion engine, as well as for other producers of polluted gases.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. An apparatus for the reduction and oxidation of constituents of a fluid, said apparatus comprising:
    an ion conducting ceramic structure;
    a passage extending through said structure;
    a first porous electrode at least partially lining the passage; and
    a second and a third porous electrode on the structure external to the passage, said second and third electrodes being oppositely disposed about the first electrode and being adapted for the application of an electrical potential difference between said second and third electrodes, whereby reduction and oxidation reactions may be made to occur concurrently about the first porous electrode.

2. An apparatus as in claim 1, wherein said passage is of a polygonal cross section.

3. An apparatus as in claim 2, wherein said passage is of a substantially rectangular cross section.

4. An apparatus as in claim 3, wherein said passage is of a substantially square cross section and the electrical potential difference is applied primarily along the diagonal of the square cross section.

5. An apparatus as in claim 1, wherein said passage is of a curvilinear cross section.

6. An apparatus as in claim 1, wherein said passage is of a substantially diamond-shaped cross section.

7. An apparatus as in claim 1, further comprising a plurality of additional passages extending through said structure and a plurality of additional porous electrodes at least partially lining respective additional passages, said additional electrodes also being juxtaposed between the second and third electrodes, whereby reduction and oxidation reactions may be made to occur about the additional porous electrodes.

8. An apparatus according to claim 1, wherein said first electrode is electrically connected to said second and third electrodes by electrolytic ion flow only.

9. A method for the reduction and oxidation of constituents of a fluid, said method comprising:
    providing an ion conducting ceramic structure having a passage extending through said structure, a first porous electrode at least partially lining the passage, a second and a third porous electrode on the structure external to the passage, said second and third electrodes being oppositely disposed about the first electrode;
    applying an electrical potential difference between the second and third electrodes; and
    introducing said fluid into said passage, wherein reduction and oxidation reactions occur concurrently about the first electrode.

10. A method as in claim 8, wherein said passage is of a polygonal cross section.

11. A method as in claim 9, wherein said passage is of a substantially rectangular cross section.

12. A method as in claim 10, wherein said passage is of a substantially square cross section and the electrical potential difference is applied primarily along the diagonal of the square cross section.

13. A method as in claim 8, wherein said passage is of a curvilinear cross section.

14. A method as in claim 8, wherein said passage is of a substantially diamond-shaped cross section.

15. A method as in claim 8, wherein said structure further comprises a plurality of additional passages extending through said structure and a plurality of additional porous electrodes at least partially lining respective additional passages, said additional electrodes also being juxtaposed between the second and third electrodes, wherein reduction and oxidation reactions may be made to occur about the additional porous electrodes.

16. A method according to claim 8, wherein said first electrode is electrically connected to said second and third electrodes by electrolytic ion flow only.

17. A device for the reduction and oxidation of constituents of a fluid, said device comprising:
    an enclosure having an inlet and an outlet;
    a honeycomb-like structure have a plurality of passages and two opposite peripheral sides, said structure being composed of an ion conducting ceramic, said structure being contained within said enclosure and being adapted for fluid entering the inlet to pass through said passages and out the outlet;

a plurality of porous electrodes, each electrode at least partially lining respective passages; and a pair of electrical conductors, each connected to a respective plurality of porous electrodes adjacent said opposite peripheral sides, said conductors being operably connectable to a voltage supply, whereby reduction and oxidation reactions may be made to occur concurrently about at least one porous electrode.

18. A device as in claim 15, wherein said passages are of a substantially square cross section and the electrical potential difference is applied primarily along the diagonal of the square cross section.

19. A device as in claim 15, wherein said passages are of a substantially diamond-shaped cross section.

20. An apparatus according to claim 15, wherein at least one of said electrodes is electrically connected to said electrodes adjacent said opposite peripheral sides by electrolytic ion flow only.

* * * * *